(12) United States Patent
Lewis

(10) Patent No.: US 10,741,067 B2
(45) Date of Patent: Aug. 11, 2020

(54) SAFETY LIGHT APPARATUS AND METHOD

(71) Applicant: Dicke Safety Products, Downers Grove, IL (US)

(72) Inventor: Richard Lewis, Southport (GB)

(73) Assignee: Dicke Safety Products, Downers Grove, IL (US)

( * ) Notice: Subject to any disclaimer, the term of this patent is extended or adjusted under 35 U.S.C. 154(b) by 727 days.

(21) Appl. No.: 15/458,665

(22) Filed: Mar. 14, 2017

(65) Prior Publication Data
US 2018/0268689 A1    Sep. 20, 2018

(51) Int. Cl.
| | | |
|---|---|---|
| *G08G 1/0955* | (2006.01) | |
| *H02J 7/35* | (2006.01) | |
| *H02J 7/00* | (2006.01) | |
| *F21V 23/04* | (2006.01) | |
| *F21S 9/03* | (2006.01) | |
| *F21W 131/10* | (2006.01) | |
| *F21Y 115/10* | (2016.01) | |
| *F21W 111/00* | (2006.01) | |

(52) U.S. Cl.
CPC ............ *G08G 1/0955* (2013.01); *F21S 9/037* (2013.01); *F21V 23/0464* (2013.01); *H02J 7/0047* (2013.01); *H02J 7/0063* (2013.01); *H02J 7/35* (2013.01); *F21V 23/0407* (2013.01); *F21W 2111/00* (2013.01); *F21W 2131/1005* (2013.01); *F21Y 2115/10* (2016.08); *H02J 2007/0067* (2013.01); *Y02B 20/72* (2013.01)

(58) Field of Classification Search
CPC .... G08G 1/0955; H02J 7/0047; H02J 7/0063; H02J 7/35
USPC .......................................................... 307/23
See application file for complete search history.

(56) References Cited

U.S. PATENT DOCUMENTS

| | | | | |
|---|---|---|---|---|
| 4,942,352 A | * | 7/1990 | Sano ...................... | H01F 38/14 320/134 |
| 5,109,224 A | * | 4/1992 | Lundberg ............... | G08G 1/164 340/907 |
| 2011/0032695 A1 | * | 2/2011 | Cumberland .......... | H05B 47/00 362/183 |
| 2014/0097786 A1 | * | 4/2014 | Grimes ........... | H01L 31/035218 320/101 |
| 2017/0205533 A1 | * | 7/2017 | Li ......................... | G01V 11/002 |
| 2017/0231053 A1 | * | 8/2017 | Underwood ........... | H05B 45/37 |
| 2018/0098404 A1 | * | 4/2018 | Hall ...................... | H05B 47/105 |
| 2019/0344815 A1 | * | 11/2019 | Denny .................... | B61L 9/04 |

* cited by examiner

*Primary Examiner* — Alfonso Perez Borroto
(74) *Attorney, Agent, or Firm* — Joseph M. Kuo

(57) ABSTRACT

The present invention is directed to a safety light, such as a barricade lamp. The safety light comprises a light member and a power source comprising a non-rechargeable battery source and a rechargeable battery source. A solar cell array is also included and is adapted to recharge the rechargeable battery source. A battery monitor and a power control processor are configured to control the supply of power to the light member by causing the rechargeable battery source to power the light member until the charge level of the rechargeable battery source falls below a certain level, at which time the power control processor causes power from the non-rechargeable battery source to power the light member.

17 Claims, 4 Drawing Sheets

SAFETY LIGHT APPARATUS AND METHOD

FIELD OF THE INVENTION

The subject invention generally relates to a safety light, such as a barricade lamp, and method for controlling the power supply to the light.

BACKGROUND OF THE INVENTION

The present invention relates generally to safety lights, such as barricade lamps that are commonly found at road construction sites. Safety lights, which are typically mounted on barricades, are designed to warn others of construction workers and other safety hazards. Such safety lights are deployed in areas remote from established power supplies, and typically depend on batteries to supply power to the light. Generally speaking, there are two different types of batteries, rechargeable and non-rechargeable. Each of these battery types has advantages and downsides.

Non-rechargeable batteries are commonplace, relatively inexpensive, and are capable to providing necessary power to a safety light. A downside for such batteries, however is that they are somewhat variable in their lifespan. This is due to numerous factors including variability in manufacturing, different producers, and unknown loss of power stored in the batteries during the period between manufacture and use. Environmental factors, such as temperature, also affect the lifespan of such batteries. As such, it is very difficult to predict with any certainty when non-rechargeable batteries for a safety light are running low or about to stop working altogether. If the batteries in a safety light run down, the ability of the safety light to warn of hazardous situations is greatly diminished. Moreover, due to the large number of safety lights typically found at a road construction project and the area over which they are distributed, it is impractical to regularly check each light. In addition to these issues, non-rechargeable batteries must be disposed of properly. Failure to properly dispose of non-rechargeable batteries can lead to significant environmental problems due to leaching of the chemicals from the batteries.

Rechargeable batteries have many of the same problems as non-rechargeable batteries, including unpredictable lifespan and disposal. Rechargeable batteries are also generally more expensive than non-rechargeable batteries. Despite this, rechargeable batteries are preferred over non-rechargeable batteries by the fact that they are rechargeable, and therefore require fewer replacements, and in the long run are most cost effective. Since it is important to be able to recharge the rechargeable batteries in the field without having to actually remove them from the safety light, rechargeable batteries may be recharged by a solar cell array included with a safety light.

Despite this, there are still drawbacks. Rechargeable batteries may not fully charge during the sunlight hours, e.g., cloudy day. As such, the rechargeable batteries still face the very real possibility of running down during the night such that the safety light is not able to illuminate. In addition, some rechargeable batteries are known to suffer from battery memory. This refers to the situation in which certain types of batteries, such as Nickel Cadmium, batteries gradually lose their maximum energy capacity if they are repeatedly recharged after being only partially discharged.

SUMMARY OF THE INVENTION

The following provides a summary of certain exemplary embodiments of the present invention. This summary is not an extensive overview and is not intended to identify key or critical aspects or elements of the present invention or to delineate its scope.

The present invention is directed to a safety light, such as a barricade lamp. According to a preferred embodiment of the invention, the safety light comprises a light member and a power source for the light member. The power source comprises a non-rechargeable battery source operatively connected to the light member, and a rechargeable battery source operatively connected to the light member. A solar cell array is also provided with the safety light. The solar cell array is operatively connected to the rechargeable battery source and adapted to recharge the rechargeable battery source. The solar cell array is isolated from the non-rechargeable battery source since recharging of the non-rechargeable battery source could cause damage thereto. Each of the rechargeable battery source and the non-rechargeable battery source include at least one battery, but may include several batteries connected together to form a power source. A battery monitor is also included with the safety light. The battery monitor is configured to determine the charge level of the rechargeable battery source. The battery monitor may be a programmed microprocessor or a control circuit as is known in the art. A power control processor is also included in the safety light. The power control processor is adapted to control the supply of power from the non-rechargeable battery source and the rechargeable battery source to the light member. The power control processor may also be a microprocessor or a control circuit as is known in the art. The description of a separate battery monitor and power control processor is largely to delineate certain functions. It should be understood that while the battery monitor and the power control circuit may be separate physical components, they may alternatively be physically integrated in a single microprocessor or control circuit that is configured to perform the functions of the battery monitor and the power control processor.

In order to control the supply of power to the light member, the battery monitor obtains a charge level signal from the rechargeable battery source. The power control processor then determines whether the charge level signal for the rechargeable battery source is less than a predetermined rechargeable battery minimum value. If not, then the power control processor causes power to be supplied to the light member from the rechargeable battery source. In a preferred embodiment, the rechargeable battery source level allows for a substantial portion of the charge of the rechargeable battery source to have been depleted before recharging to minimize the possibility or extent of battery memory.

In a preferred embodiment, the battery monitor then waits a flash cycle before again determining the a second charge level signal from the rechargeable battery source such that the power control processor can determines whether the charge level signal for the rechargeable battery source is less than a predetermined rechargeable battery minimum value. A flash cycle refers to the time from the beginning of a flash to the beginning of the next flash. In other words, it is the total time that the light member is illuminated plus the time that it is not lit, i.e., between flashes, before the next flash comes on and the cycle is repeated.

If the power control processor determines that a charge level signal for the rechargeable battery source is less than the predetermined rechargeable battery minimum value, the power control processor switches the source of power to the light member to the non-rechargeable battery source. The power control processor also allows the solar cell array to recharge the rechargeable battery source. In some embodiments, the charging of the solar cell array may only take place upon actuation by the power control processor. In other embodiments, the solar cell array may continuously be allowed to recharge the rechargeable battery until fully recharged.

After a period of time, the power control processor determines whether a rechargeable battery recovery period has elapsed. In a preferred embodiment, the power control processor waits at least a flash cycle before checking whether the rechargeable battery recovery period has elapsed. The rechargeable battery recovery period may be predetermined or may be determined by the power control processor based on the output from the solar cell array. For example, if the power control processor determines that the solar cell array is not generating electricity at a high rate, such as on a cloudy day, the rechargeable battery recovery period may be longer than on a sunny day.

Regardless, if the power control processor determines that the rechargeable battery recovery period has elapsed, the battery monitor again determines a charge level signal for the rechargeable battery source. The power control processor again compares this charge level signal with the rechargeable battery minimum value to determine whether the rechargeable battery is sufficiently charged. If so, the power control processor may switch the source of power for the light member to the rechargeable battery source, thereby conserving the non-rechargeable battery source. In some embodiments, instead of comparing the charge level signal with a rechargeable battery minimum value, the power control processor may determine whether a rechargeable battery minimum recharge value is met. In other words, rather than checking to ensure that the charge level of the rechargeable battery is above that requiring recharge, the power control processor allows the rechargeable battery be recharged to some other higher desired recharge level.

In some preferred embodiments, the battery monitor may be configured to monitor the non-rechargeable battery and determine a non-rechargeable battery charge level signal indicative of the remaining charge of the non-rechargeable battery source. If the non-rechargeable battery charge level signal is below an amount indicating the need to replace the non-rechargeable battery source, i.e., a replace non-rechargeable battery value, the power control processor may be configured to actuate an indicator to signal the need for replacing the non-rechargeable battery. This indicator may take the form of an audible signal or a visual signal. An example of a visual signal include a flashing sequence different from the normal sequence, a different color light being emitted from the light member, or other indicator.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention.

DETAILED DESCRIPTION OF THE INVENTION

Figure 1:
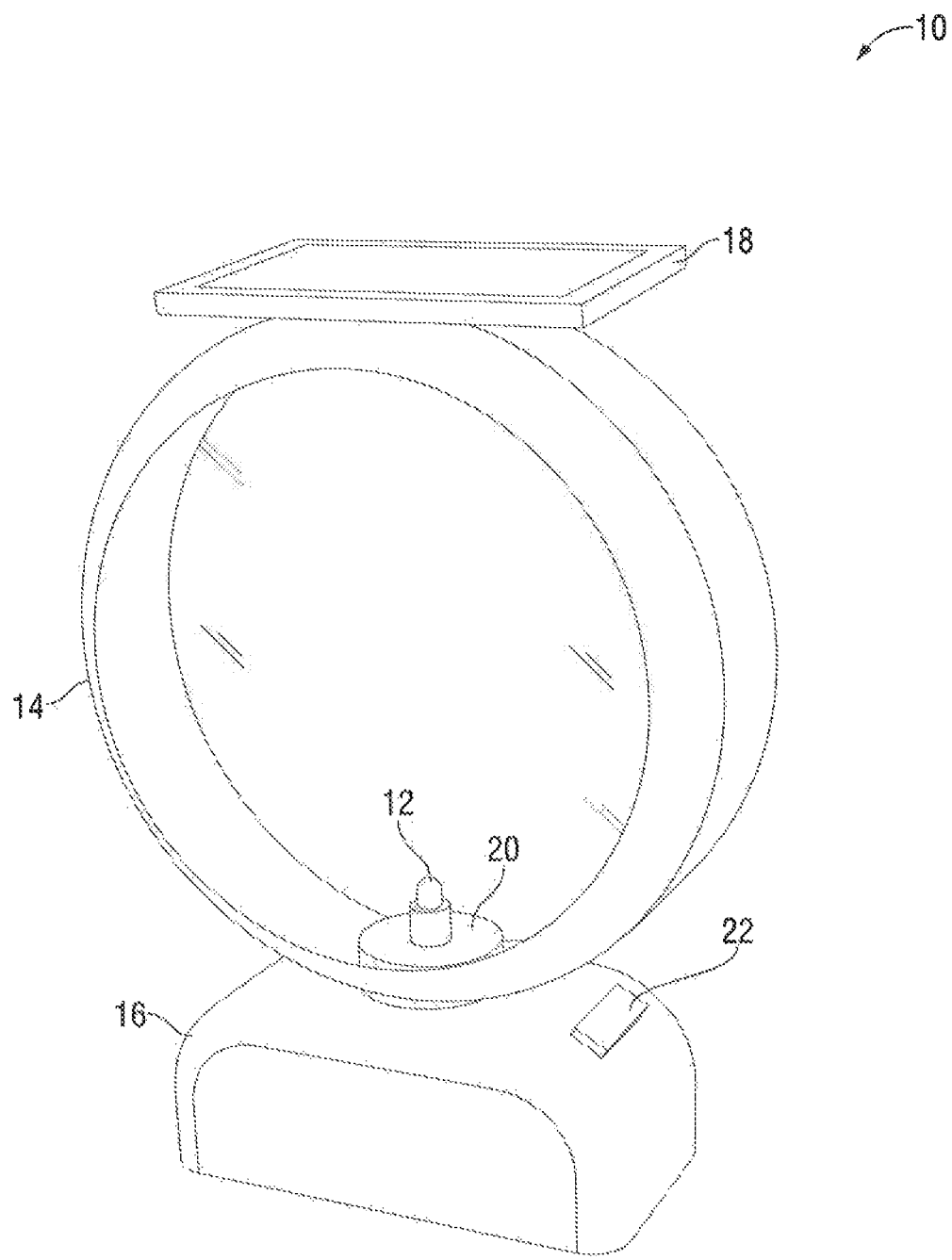
FIG. 1 is a perspective view of an exemplary embodiment of a safety light in accordance with a preferred embodiment of the present invention with a portion cutaway to show the interior of the safety light.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Referring to FIG. 1, a safety light 10 according a preferred embodiment of the invention is shown. Safety light 10 includes a light member 12 disposed in a light housing 14. The light member is preferably a high intensity LED. LEDs are preferred for a number of reasons including their lower power consumption, low heat generation, durability, and long life. Light member 12 mounted with socket 20, as is known in the art. The lighting housing 14 is preferably a high impact polypropylene body having a polycarbonate lens, as is known in the art. The light socket 20 may be formed with base member 16. Base member 16 is adapted to be secured to a warning sign (not shown), such as a road construction sign or barrel, or some other warning sign. Base member 16 is preferably made of a durable, weatherproof material, such as polypropylene or other co-polymer plastic. Housed within the base member 16 are a non-rechargeable battery source, a rechargeable battery source and a processor, as will be discussed below. In a preferred embodiment, the base member 16 also has mounted thereon a light indicator 22, which senses ambient light. The light indicator 22 is further operatively connected to the processor such that the light member 12 is caused to flash only when ambient light levels are sufficiently low.

In this embodiment, a solar cell array 18 is provided at the top of the light housing 14. The solar cell array comprises a plurality of solar or photovoltaic cells. The solar cell array 14 preferably is configured as a rectangular panel with a side adapted to face the Sun or other light source. The solar cell array 18 receives solar energy from the Sun or other light source and converts the light energy into electricity by a circuit board (not shown) as is known in the art.

Figure 2:
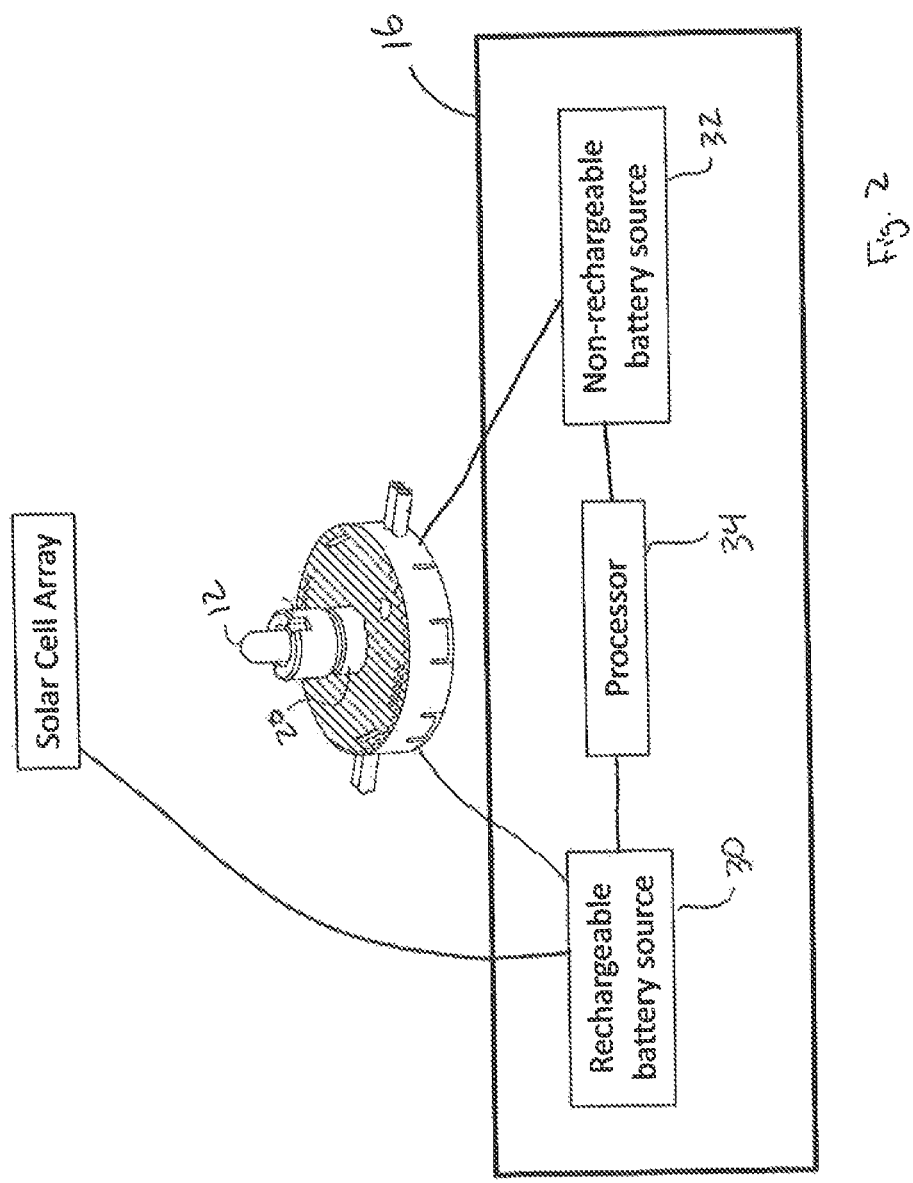
FIG. 2 is a schematic view of various components of the safety light of FIG. 1.

Referring to FIG. 2, a schematic of various interconnected components of safety light 10 are described. As discussed, the base member 16 includes a rechargeable battery source 30, a processor 34, and a non-rechargeable battery source 32. In this embodiment, the processor 34 serves as both the battery monitor and the power control processor. Connected to the rechargeable battery source 30 is solar cell array 18. Light member 12 is connected to both of the rechargeable battery source 30 and the non-rechargeable battery source 32 via socket 20.

Figure 3:
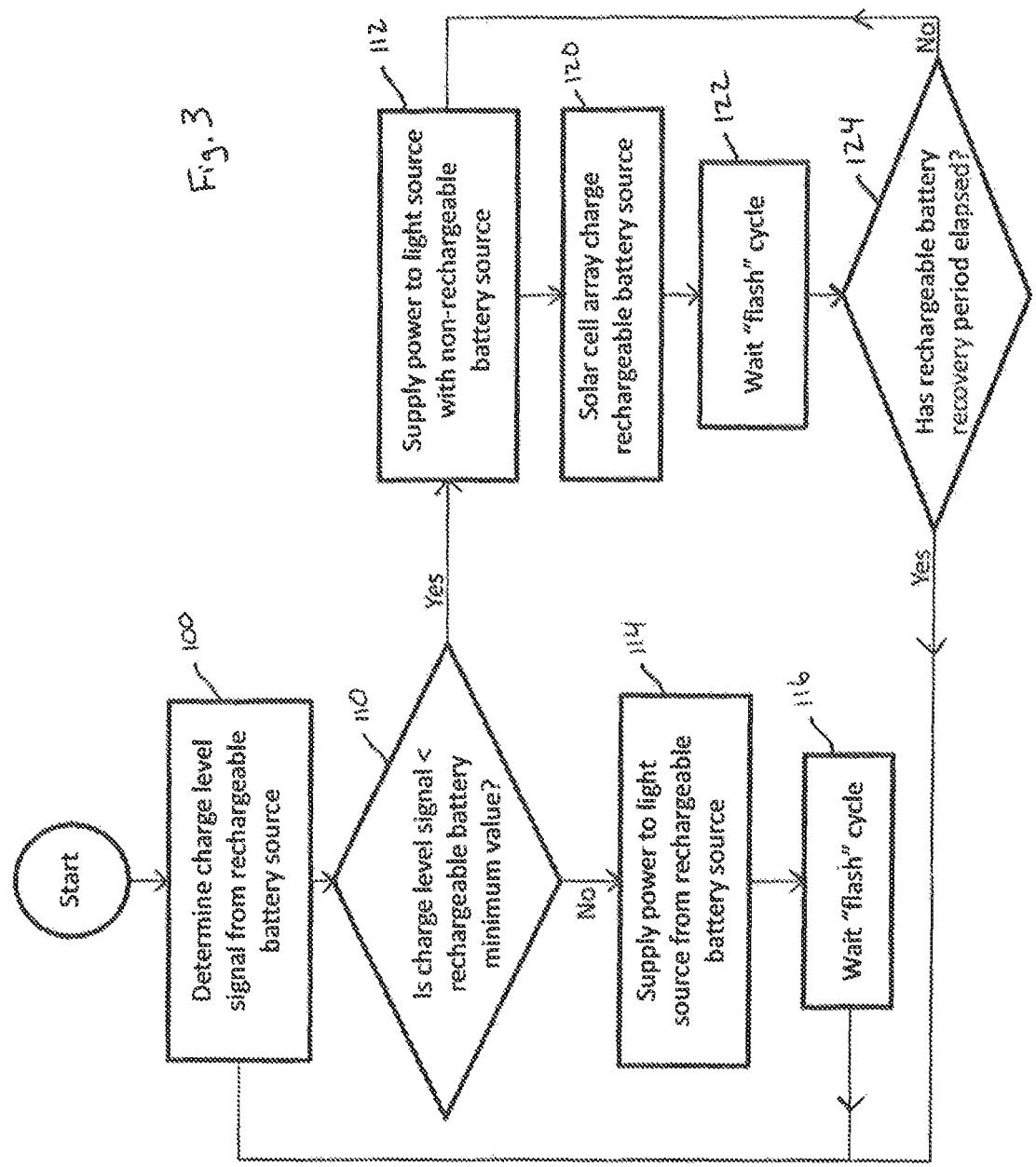
FIG. 3 is a flowchart depicting a preferred operation of the safety light of FIG. 1.

Referring to FIGS. 2 and 3, a preferred operation of the safety light 10 is described. The battery monitor, which in this embodiment is part of processor 34, determines a charge level signal from the rechargeable battery source 30. See box 100. The power control processor, which is also integrated in processor 34, then determines whether the charge level signal for the rechargeable battery source is less than a rechargeable battery minimum value. See box 110. If the charge level signal for the rechargeable battery source is not less than the rechargeable battery minimum value, this indicates that the rechargeable battery source 30 is not in need of recharging. In order to reduce the effects of battery memory, it is preferred that the rechargeable battery minimum value represent a scenario where a substantial portion of the capacity of the rechargeable battery source has been depleted. If the rechargeable battery source is not in need of recharging, the power control processor enables or allows power to be supplied to the light member 12 from the rechargeable battery source 30. See box 114. The battery monitor waits a period of time, preferably a flash cycle, before determining a second charge level signal from the rechargeable battery source such that the power control processor can determines whether the charge level signal for the rechargeable battery source is less than the rechargeable battery minimum value. See box 116. The time between when the battery monitor determines a charge level signal for the rechargeable battery source can be a longer period if desired.

If the comparison of the charge level signal with the rechargeable battery minimum value (box 110) shows that the charge level signal for the rechargeable battery source is less than the rechargeable battery minimum value, i.e., the rechargeable battery needs to be recharged, the power control processor switches the source of power to the light member to the non-rechargeable battery source. See box 112. The power control processor also allows the solar cell array to recharge the rechargeable battery source. 120. Although not depicted, it should be understood that the solar cell array 18 may continuously provide electrical energy to the rechargeable battery source 30. In a preferred embodiment, the processor 34 is further configured to prevent overcharging of the rechargeable battery source by discontinuing the supply of electrical energy to the rechargeable battery source if the charge level signal indicates that the rechargeable battery source is full charged.

In the embodiment shown, the power control processor then waits a flash cycle. Box 122. At a time after the flash cycle, the power control processor determines whether a rechargeable battery recovery period has elapsed. Box 124. If the rechargeable battery recovery period has not elapsed, the power control processor continues to cause power to be supplied to the light source from the non-rechargeable battery source. If the power control processor determines that the rechargeable battery recovery period has elapsed, the battery monitor again determines a charge level signal for the rechargeable battery source. Box 100. The power control processor compares this charge level signal with the rechargeable battery minimum value to determine whether the rechargeable battery is sufficiently charged. Box 110. If so, the power control processor switches the source of power for the light member to the rechargeable battery source, thereby conserving the non-rechargeable battery source. Box 114.

Figure 4:
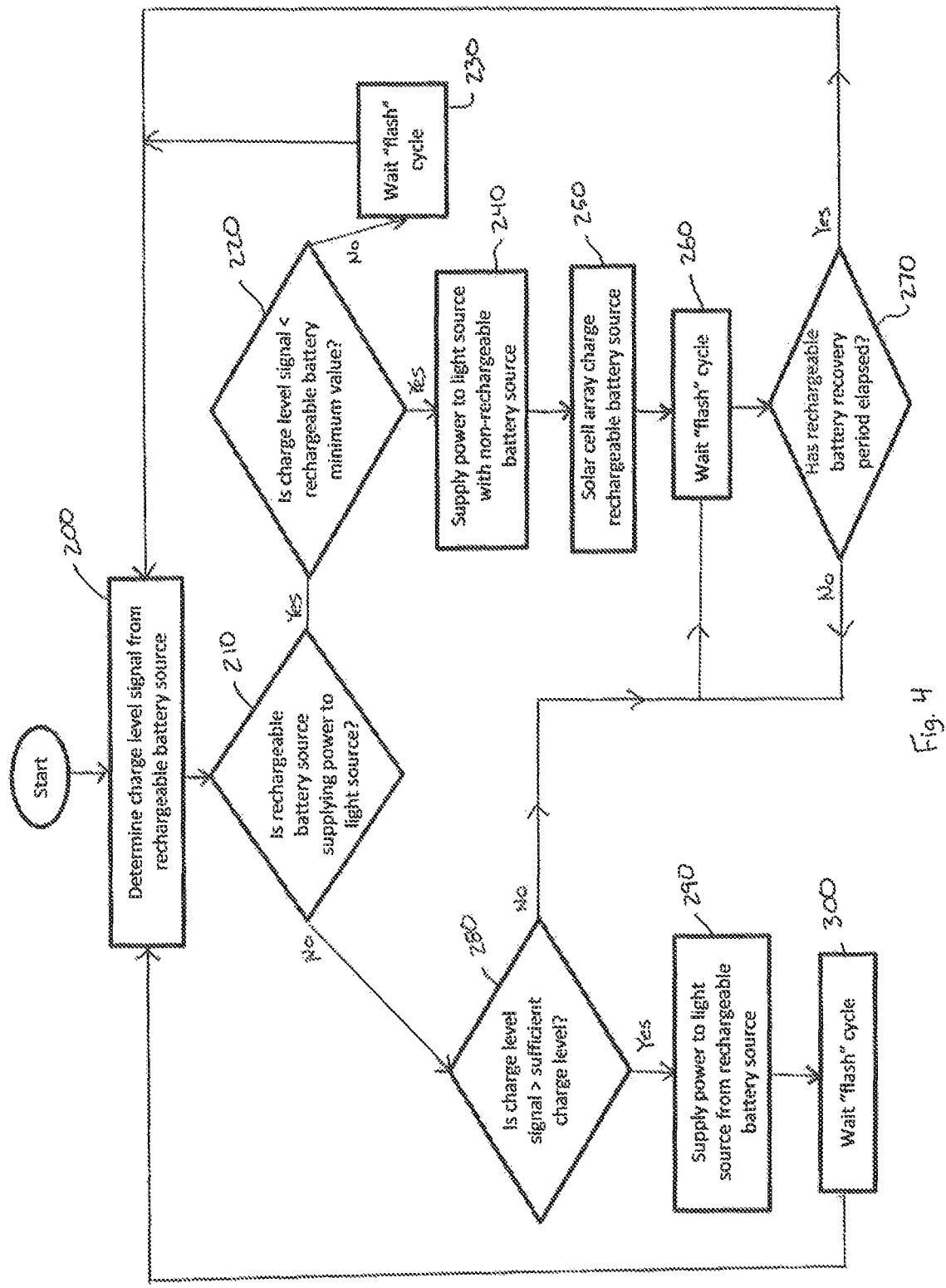
FIG. 4 is a flowchart depicting an additional preferred operation of the safety light of FIG. 1.

Referring to FIG. 4, an alternative flowchart of the operation of the safety light 12 is discussed. In this embodiment, it is desired to have the rechargeable battery charged sufficiently before reverting the supply of power for the light member from the non-rechargeable battery source to the rechargeable battery source. The components for the safety light 12 are the same as the previous embodiment.

As with the previous embodiment, the battery monitor determines a charge level signal for the rechargeable battery source. Box 200. The power control processor then queries whether the light member is currently being powered by the rechargeable battery source or the non-rechargeable battery source. Box 210. If the rechargeable battery source is supplying power to the light member, the power control processor then determines whether the rechargeable battery charge level signal is below a rechargeable battery minimum value, which provides a lower threshold value for when recharging is desired. Box 220. If the rechargeable battery charge level signal is above the rechargeable battery minimum value, power will continue to be supplied to the light member from the rechargeable battery source. In a preferred embodiment, the power control processor will wait a flash cycle. Box 230. The battery monitor then determines another charge level signal for the rechargeable battery source. Box 200.

If, however, the rechargeable battery charge level signal is less than the rechargeable battery minimum value, thereby indicating that recharging is desired (Box 240), the power control processor discontinues enabling power to the light member to be supplied from the rechargeable battery source, and causes power to be supplied by the non-rechargeable battery source. The power control processor allows electrical energy to be supplied from the solar cell array to the rechargeable battery source. Box 250. The power control processor then waits a flash cycle. Box 260. The power control processor then determines whether a battery recovery period has elapsed. Box 270. If not, the power control processor waits another flash cycle before against determining whether a battery recovery period has elapsed. Box 260. If a battery recovery period has elapsed, the battery monitor again determines a charge level signal for the rechargeable battery. Box 200.

If, as shown at Box 210, the power control processor determines that the light member is currently being by the non-rechargeable battery source, the power control processor then determines if the rechargeable battery charge level signal is above a sufficient charge level. Box 280. This sufficient charge level is at least as high as the rechargeable battery minimum value, but is preferably higher. By having a sufficient charge level higher than the rechargeable battery minimum value, the rechargeable battery source can be charged over the lower threshold to power the light member. If the rechargeable battery charge level signal is above the sufficient charge level, the power control processor enables power to be supplied to the light member by the rechargeable battery source. Box 290. If, however, the rechargeable battery charge level signal is still below the sufficient charge level, the power control processor waits a flash cycle (Box 260), and determines if a battery recovery period has elapsed (Box 270) before checking again. If the battery recovery period has elapsed, the battery monitor determines another rechargeable so the process can repeat. Box 200.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed is:

1. A safety light comprising:
   a light member;
   a power source adapted to supply power to the light member, the power source including:
   a non-rechargeable battery source operatively connected to the light member, and
   a rechargeable battery source operatively connected to the light member;
   a solar cell array operatively connected to and adapted to supply electrical energy to the rechargeable battery source, the solar cell array further being isolated from the non-rechargeable battery source;
   a battery monitor operatively connected to the rechargeable battery source, the battery monitor adapted to determine the charge level of the rechargeable battery source; and
   a power control processor operatively connected to the non-rechargeable battery source and the rechargeable battery source, the power control processor adapted to control the supply of power from the non-rechargeable battery source and the rechargeable battery source to the light member.

2. The safety light of claim 1, wherein an integrated processor comprises the battery monitor and the power control processor.

3. The safety light of claim 1, wherein the battery monitor is configured to determine a charge level signal from the rechargeable battery source, and the power control processor is configured to determine whether the charge level signal is less than a rechargeable battery minimum value.

4. The safety light of claim 3, wherein the power control processor is further configured to determine whether the charge level signal is greater than a sufficient charge level.

5. The safety light of claim 3, wherein the power control processor is configured to cause power to be supplied to the light member from the non-rechargeable battery source when the charge level signal is less than the rechargeable battery minimum value.

6. The safety light of claim 5, wherein the power control processor is further configured to determine whether a rechargeable battery recovery period has elapsed, and the battery monitor is further to determine a second charge level signal after the rechargeable battery recovery period has elapsed, the power control processor further adapted to compare the second charge level signal with the predetermined rechargeable battery minimum value and to cause power to be supplied to the light member from the rechargeable battery source when the charge level signal is greater than the predetermined rechargeable battery minimum value.

7. The safety light of claim 5, wherein the power control processor is further configured to determine whether a rechargeable battery recovery period has elapsed, and the battery monitor is further to determine a second charge level signal after the rechargeable battery recovery period has elapsed, the power control processor further adapted to compare the second charge level signal with a sufficient charge level and to cause power to be supplied to the light member from the rechargeable battery source when the charge level signal is greater than the a sufficient charge level.

8. The safety light of claim 5, wherein the battery monitor is further configured to determine a non-rechargeable battery charge level signal, and the power control processor is further configured to compare the non-rechargeable battery charge level signal to a replace battery value and to actuate an indicator if the non-rechargeable battery charge level signal is less than the replace battery value.

9. The safety light of claim 1, wherein power control processor is further configured to determine whether the rechargeable battery source is fully charged and to discontinue the supply of electrical energy from the solar cell array to the rechargeable battery source when the rechargeable battery source is fully charged.

10. A safety light comprising:
    a light member;
    a processor comprising a battery monitor and a power control processor;
    a power source comprising a non-rechargeable battery source operatively connected to the light member, and a rechargeable battery source operatively connected to the light member; and
    a solar cell array operatively connected to and adapted to supply electrical energy to the rechargeable battery source, the solar cell array further being isolated from the non-rechargeable battery source;
    the battery monitor configured to determine a charge level signal from the rechargeable battery source,
    the power control processor configured to determine whether the charge level signal is less than a rechargeable battery minimum value and to cause power to be supplied to the light member from the non-rechargeable battery source when the charge level signal is less than the predetermined rechargeable battery minimum value.

11. The safety light of claim 10, wherein the power control processor is further configured to determine whether a rechargeable battery recovery period has elapsed, and the battery monitor is further to determine a second charge level signal after the rechargeable battery recovery period has elapsed, the power control processor further adapted to compare the second charge level signal with the rechargeable battery minimum value and to cause power to be supplied to the light member from the rechargeable battery source when the charge level signal is greater than the rechargeable battery minimum value.

12. The safety light of claim 10, wherein the power control processor is further configured to determine whether a rechargeable battery recovery period has elapsed, and the battery monitor is further to determine a second charge level signal after the rechargeable battery recovery period has elapsed, the power control processor further adapted to compare the second charge level signal with a sufficient charge level and to cause power to be supplied to the light member from the rechargeable battery source when the charge level signal is greater than the sufficient charge level.

13. The safety light of claim 10, wherein the battery monitor is further configured to determine a non-rechargeable battery charge level signal, and the power control processor is further configured to compare the non-rechargeable battery charge level signal to a replace battery value and to actuate an indicator if the non-rechargeable battery charge level signal is less than the replace battery value.

14. The safety light of claim 10, wherein power control processor is further configured to determine whether the rechargeable battery source is fully charged and to discontinue the supply of electrical energy from the solar cell array to the rechargeable battery source when the rechargeable battery source is fully charged.

15. A method for controlling the supply of battery power to a safety light, the method comprising:
- causing a battery monitor to determine a charge level signal of a rechargeable battery source;
- causing a power control processor to determine if the charge level signal of the rechargeable battery source is less than a rechargeable battery minimum value;
- causing the power control processor to enable power to be supplied to a light member from a non-rechargeable battery source and to enable electrical energy to be supplied from a solar cell array to the rechargeable battery source when the charge level signal from the rechargeable battery source is less than the rechargeable battery minimum value;
- causing the battery monitor to obtain a second charge level signal from the rechargeable battery source after a rechargeable battery recovery period;
- causing the power control processor to determine if the second charge level signal from the rechargeable battery source is greater than the rechargeable battery minimum value; and
- causing the power control processor to enable power to be supplied to the light member from the rechargeable battery source when the charge level signal from the rechargeable battery source is greater than at least the rechargeable battery minimum value.

16. The method of claim 15, further comprising, causing the power control processor:
- to determine whether the non-rechargeable battery source is supplying power to the light member,
- to determine if the charge level signal of the rechargeable battery exceeds a sufficient charge level when the non-rechargeable battery source is supplying power to the light member, and
- to cause power to be supplied to the light member from the rechargeable battery source when the charge level signal from the rechargeable battery source is greater than the rechargeable battery minimum value and the sufficient charge level.

17. The method of claim 15, further comprising:
- causing the battery monitor to determine a non-rechargeable battery source level;
- causing the power control processor to determine whether the non-rechargeable battery charge level signal is below a replace non-rechargeable battery value, and
- causing the power control processor to actuate an indicator when the non-rechargeable battery charge level signal.

* * * * *